United States Patent
Moon et al.

(10) Patent No.: US 7,253,866 B2
(45) Date of Patent: Aug. 7, 2007

(54) METHOD OF FABRICATING LIQUID CRYSTAL DISPLAY DEVICE

(75) Inventors: Hong Man Moon, Kyoungsangbuk-do (KR); Su Woong Lee, Kyongsangbuk-do (KR); Kyoung Nam Lim, Kyongsangbuk-do (KR); Jin Kyu Kang, Incheon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/271,557

(22) Filed: Oct. 17, 2002

(65) Prior Publication Data

US 2003/0081155 A1    May 1, 2003

(30) Foreign Application Priority Data

Oct. 27, 2001 (KR) ............... 10-2001-0066560
Dec. 26, 2001 (KR) ............... 10-2001-0085173

(51) Int. Cl.
G02F 1/1339  (2006.01)
G02F 1/1333  (2006.01)

(52) U.S. Cl. ............... 349/153; 349/190; 349/110
(58) Field of Classification Search .......... 349/190, 349/153, 110
See application file for complete search history.

(56) References Cited

U.S. PATENT DOCUMENTS

| | | | |
|---|---|---|---|
| 4,094,058 A | | 6/1978 | Yasutake et al. |
| 4,691,995 A | | 9/1987 | Yamazaki et al. |
| 5,521,728 A | * | 5/1996 | Kodate et al. ............ 349/42 |
| 5,781,253 A | * | 7/1998 | Koike et al. ............ 349/40 |
| 5,875,922 A | | 3/1999 | Chastine et al. |
| 5,889,569 A | * | 3/1999 | Okamoto et al. ............ 349/110 |
| 6,034,757 A | * | 3/2000 | Yanagawa et al. ............ 349/141 |
| 6,084,648 A | * | 7/2000 | Yeo ............ 349/40 |
| 6,268,896 B1 | * | 7/2001 | Takasaki et al. ............ 349/110 |
| 6,284,087 B1 | * | 9/2001 | von Gutfeld et al. ..... 156/275.5 |
| 6,304,311 B1 | | 10/2001 | Egami et al. |
| 6,310,667 B1 | * | 10/2001 | Nakayoshi et al. ............ 349/42 |
| 6,424,394 B1 | * | 7/2002 | Morii ............ 349/110 |
| 6,545,359 B1 | * | 4/2003 | Ohtani et al. ............ 257/758 |
| 6,724,458 B2 | * | 4/2004 | Kim et al. ............ 349/156 |
| 6,741,322 B2 | * | 5/2004 | Byun et al. ............ 349/190 |
| 2001/0021000 A1 | | 9/2001 | Egami et al. |
| 2002/0047963 A1 | * | 4/2002 | Youn et al. ............ 349/110 |
| 2002/0122143 A1 | * | 9/2002 | Woo et al. ............ 349/42 |
| 2002/0176040 A1 | * | 11/2002 | Lim et al. ............ 349/113 |
| 2002/0196393 A1 | * | 12/2002 | Tashiro et al. ............ 349/106 |
| 2003/0043338 A1 | * | 3/2003 | Liou et al. ............ 349/189 |
| 2003/0117570 A1 | * | 6/2003 | Kim ............ 349/153 |

FOREIGN PATENT DOCUMENTS

EP    1003066    5/2000

(Continued)

OTHER PUBLICATIONS

Communication from Korean Patent Office dated Jun. 20, 2006.

*Primary Examiner*—Mike Qi
(74) *Attorney, Agent, or Firm*—McKenna Long & Aldridge LLP

(57) ABSTRACT

A method of fabricating a liquid crystal display device includes forming a thin film transistor array on an active area of a first substrate, forming a color filter layer and a black matrix layer on a second substrate, forming a sealant along a peripheral portion of the second substrate, bonding the first and second substrates, and hardening the sealant by exposure to light, wherein the black matrix layer and the sealant are offset and do not overlap each other.

22 Claims, 24 Drawing Sheets

FOREIGN PATENT DOCUMENTS

| | | |
|---|---|---|
| JP | 51-65656 | 6/1976 |
| JP | 52-149725 | 12/1977 |
| JP | 59-57221 | 5/1984 |
| JP | 59-195222 | 11/1984 |
| JP | 60-111221 | 6/1985 |
| JP | 5-154923 | 6/1993 |
| JP | 6-235925 | 8/1994 |
| JP | 6-313870 | 8/1994 |
| JP | 7-84268 | 3/1995 |
| JP | 8-101395 | 4/1996 |
| JP | 08-171097 | 7/1996 |
| JP | 09-033933 | 2/1997 |
| JP | 9-61829 | 3/1997 |
| JP | 10-177178 | 6/1998 |
| JP | 10-253971 | 9/1998 |
| JP | 10-333157 | 12/1998 |
| JP | 10-333159 | 12/1998 |
| JP | 11-133438 | 12/1998 |
| JP | 11-142864 | 5/1999 |
| JP | 11-248930 | 9/1999 |
| JP | 11-326922 | 11/1999 |
| JP | 2000-2879 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 8/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117109 | 4/2001 |
| JP | 2001-133745 | 5/2001 |
| JP | 2001-133799 | 5/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-356353 | 12/2001 |
| KR | 2000-35302 | 6/2000 |

\* cited by examiner heat heat heat

METHOD OF FABRICATING LIQUID CRYSTAL DISPLAY DEVICE

The present invention claims the benefit of Korean Patent Application Nos. P2001-66560 filed in Korea on Oct. 27, 2001, and P2001-85173 filed in Korea on Dec. 26, 2001, which are hereby incorporated by reference.

BACKGROUND OF THE INVENTION

1. Field of the Invention

The present invention relates to a method of fabricating a liquid crystal display device, and more particularly, to a method of fabricating a liquid crystal display device by liquid crystal dropping or vacuum injection using a UV-hardening and thermo-hardening sealant.

2. Discussion of the Related Art

In response to an increasing demand for various types of displays devices, flat panel type displays such as liquid crystal display (LCD), plasma display panel (PDP), electro-luminescent display (ELD), and vacuum fluorescent display (VFD) have been developed. In particular, LCD devices have been commonly used because of their high resolution, light weight, thin profile, and low power consumption. In addition, LCD devices have been implemented in mobile devices such as monitors for notebook computers, and for monitors of computers and televisions. Accordingly, efforts to improve image quality of LCD devices contrast with benefits of their high resolution, light weight, thin profile, and low power consumption. In order to incorporate LCD devices as a general image display, image qualities such as sharpness, brightness, and large-sized area, for example, must be maintained.

FIG. 1 is a plane view of a liquid crystal display device having a C/F substrate bonded onto a TFT substrate according to the related art. In FIG. 1, a thermo-hardening sealant is used to bond a second substrate (i.e., color filter (C/F) substrate) 150 on top of a first substrate (i.e., thin film transistor (TFT) substrate) 100 by conventional hot-press equipment. Although a single bonded glass panel is shown in FIG. 1, a plurality of glass panels are simultaneously bonded, the thermo-hardening sealant 110 is hardened, and the panels are cut into a plurality of individual unit panels. Then, liquid crystal material is injected into each of the unit panels by a vacuum injection process.

FIGS. 2A to 2D are cross-sectional views of a fabrication process of the liquid crystal display device along I-I' of FIG. 1 according to the related art. In FIG. 2A, a first alignment layer 101 is formed on a first substrate 100, where an active area 120 is defined. Although not shown, the first substrate includes a thin film transistor array having a plurality of gate lines, data lines, pixel electrodes, and thin film transistors formed in the active area 120. In addition, metal patterns 140 are formed along one peripheral side of the active area 120 to function as a common line.

A second alignment layer 151 is formed on a second substrate 150. Although not shown, the second substrate 150 includes a black matrix, a plurality of color filter layers, and a common electrode formed in the active area 120. In addition, a black matrix layer 130 is formed on a periphery of the active area 120.

In FIG. 2B, spacers 102 are positioned on the first alignment layer 101, and a thermo-hardening sealant 110 is formed on the second alignment layer 151 along the periphery of the active area 120. The thermo-hardening sealant 110 is formed as a wide bead along the periphery of the active area 120 when a line width of the black matrix layer 130 is relatively large.

In FIG. 2C, the second substrate 150 is aligned over the first substrate 100 so that a surface of the second substrate 150 on which the thermo-hardening sealant 110 is formed faces downward. The first and second substrates 100 and 150 are then bonded to each other, and the thermo-hardening sealant 110 is hardened for one hour at 140° C. in a conventional hot press 170.

In FIG. 2D, after a cutting process is performed to create individual unit panels (not shown), a liquid crystal material 103a is injected into each of the unit panels through an injection inlet 111 (in FIG. 1) using a vacuum injection method. The liquid crystal material injection is performed by vacuum injection using a pressure difference between an interior of the unit panel at an ambient pressure of the processing chamber. The injection inlet for the liquid crystal material injection is sealed after completion of the liquid crystal injection process.

FIG. 3 is a plane view of another liquid crystal display device having a TFT substrate bonded onto a C/F substrate according to the related art. In FIG. 3, spacers (not shown) are positioned on a second substrate 150 having a color filter array formed in an active area 120 and a black matrix layer (not shown) is formed along a periphery of the active area 120. In addition, a thermo-hardening sealant 110 is formed on a portion of a metal pattern 140 outside the active area 120 of a first substrate 100 having a thin film transistor array formed in the active area 120 and the metal pattern 140 at one side of the periphery of the active area 120. The first and second substrates 100 and 150 are then bonded to each other so that the thermo-hardening sealant 110 faces a lower direction, and the thermo-hardening sealant 110 is thermo-hardened in a hot press. Accordingly, the thermo-hardening sealant 110 is formed thereon so as to have an injection inlet for injecting liquid crystals.

FIGS. 4A to 4D are cross-sectional views of a fabrication process of the along II-II' of FIG. 3 according to the related art. In FIG. 4A, a first alignment layer 101 is formed on a first substrate 100 having a thin film transistor array (not shown) formed in an active area 120 and a metal pattern 140 formed along one side of a periphery of the active area 120. In addition, a second alignment layer 151 is formed on a second substrate 150 having a color filter array (not shown) formed in the active area 120 and a black matrix 130 formed along the periphery of the active area 120.

In FIG. 4B, a thermo-hardening sealant 110 is formed along the periphery of the active area 120 on the first alignment layer 101, and spacers 102 are positioned on the second alignment layer 151. The thermo-hardening sealant 110 is formed of a narrow bead since a line width of a black matrix (not shown) formed along the periphery of the active area 120 of the first substrate 100 is relatively narrow.

In FIG. 4C, the first substrate 100 is aligned over the second substrate 150 so that a surface of the first substrate 100 on which the thermo-hardening sealant 110 is formed faces a lower direction. The first and second substrates 100 and 150 are then bonded to each other, and the thermo-hardening sealant 110 is hardened for one hour at 140° C. in a conventional hot press 170.

In FIG. 4D, after the bonded substrates have been cut into a plurality of individual unit panels, a liquid crystal material 103a is injected in each of the unit panels through an injection inlet 111 by a vacuum injection process. The liquid crystal injection is carried out by the vacuum injection process using a pressure difference between an interior of the unit panel and an ambient pressure of the processing chamber. The injection inlet for the liquid crystal material injection is sealed after completion of the liquid crystal injection process.

The thermo-hardening sealant is commonly selected from a group including of epoxy resin, urethane resin, and phenol resin. An epoxy ring of the epoxy resin is opened by a hardener such as amine or amide, and the opened epoxy ring becomes a reactive site so as to open another epoxy ring as a chain reaction, whereby a polymer chain is generated. This reaction is called "hardening." A room-temperature-type hardening epoxy resin becomes active immediately at a room temperature, while a thermo-hardening type epoxy resin is hardened within 30~60 minutes by being heated at 120~140° C. In order to complete the above reaction, a heat application method is commonly used. A hardened epoxy compound enables sufficient bonding of the two substrates to each other, and the hardened epoxy compound has a relatively large density.

Unfortunately, the method of fabricating the liquid crystal display device according to the related art has disadvantages. First, as panel size increases, the liquid crystal material injection process is time consuming, whereby insufficient liquid crystal material injection may occur leading to failure of the device. Second, unhardened sealant may leak into the active area of the unit panel, thereby contaminating the liquid crystal material and causing stains.

SUMMARY OF THE INVENTION

Accordingly, the present invention is directed to a method of fabricating a liquid crystal display that substantially obviates one or more problems due to limitations and disadvantages of the related art.

An object of the present invention is to provide a method of fabricating a liquid crystal display device using a photo-hardened sealant, thereby preventing contamination of liquid crystal material.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a method of fabricating a liquid crystal display device includes forming a thin film transistor array on an active area of a first substrate, forming a color filter layer and a black matrix layer on a second substrate, forming a sealant along a peripheral portion of the second substrate, bonding the first and second substrates, and hardening the sealant by exposure to light, wherein the black matrix layer and the sealant are offset and do not overlap each other.

In another aspect, a method of fabricating a liquid crystal display device includes forming a thin film transistor within an active area of a first substrate, forming a color filter layer on a second substrate, forming a photo-hardening sealant along a periphery of the active area, bonding the first and second substrates, and hardening the sealant by exposure to light, wherein the active area is bounded by a metal pattern having a plurality of through-holes.

In another aspect, a method of fabricating a liquid crystal display device includes forming a thin film transistor within an active area of a first substrate, forming a color filter layer on a second substrate, forming a photo-hardening sealant along a periphery of the active area, bonding the first and second substrates, and hardening the sealant by exposure to light, wherein the active area is bounded by a metal pattern having at least one slit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
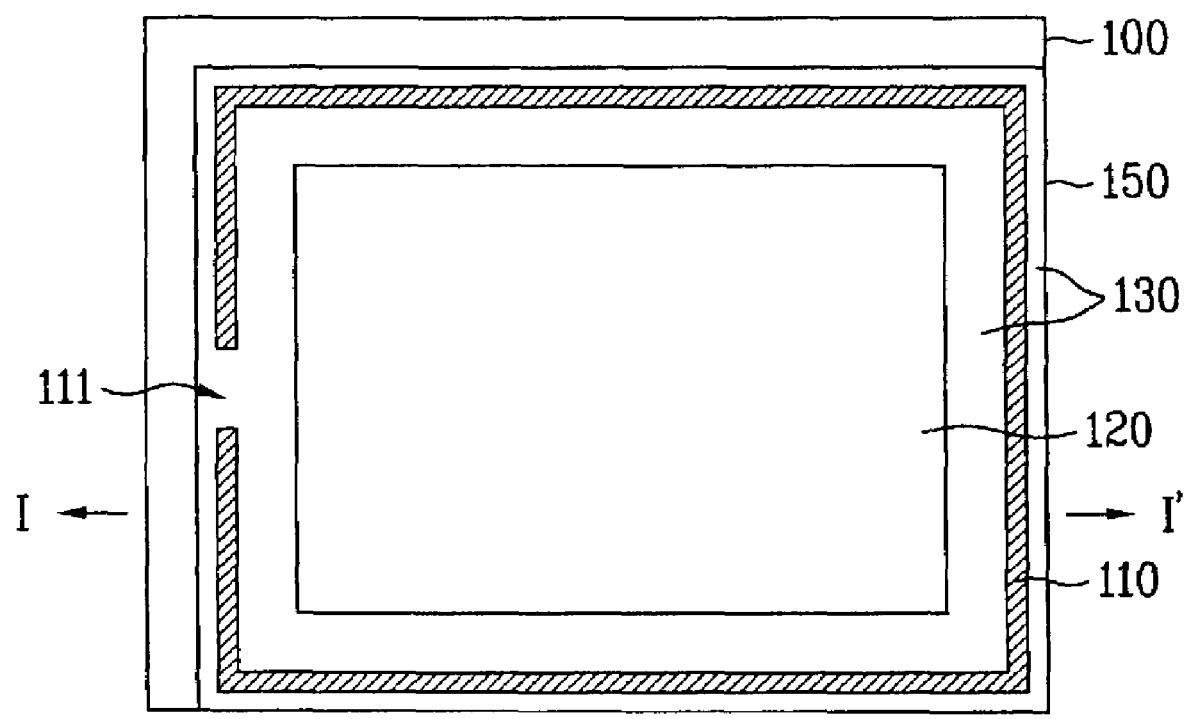
FIG. 1 is a plane view of a liquid crystal display device having a C/F substrate bonded onto a TFT substrate according to the related art.
Figure 2A:
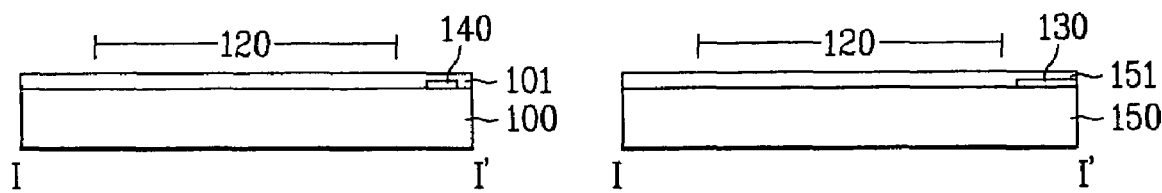
FIGS. 2A to 2D are cross-sectional views of a fabrication process of the liquid crystal display device along I-I' of FIG. 1 according to the related art.
Figure 2B:
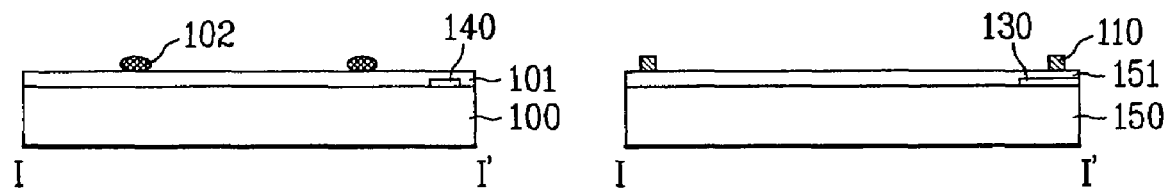
Figure 2C:
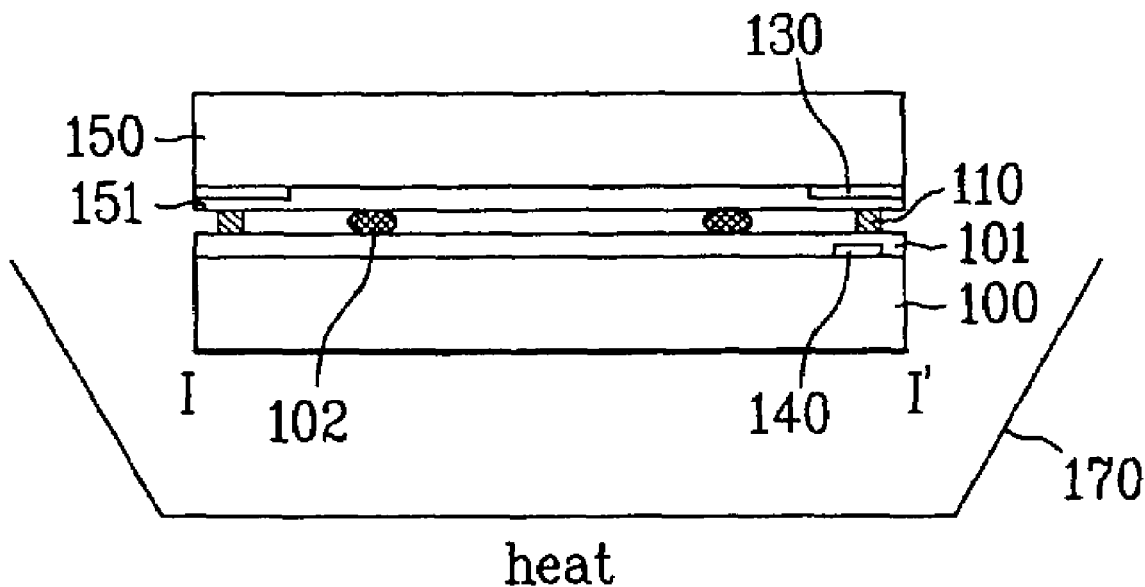
Figure 2D:
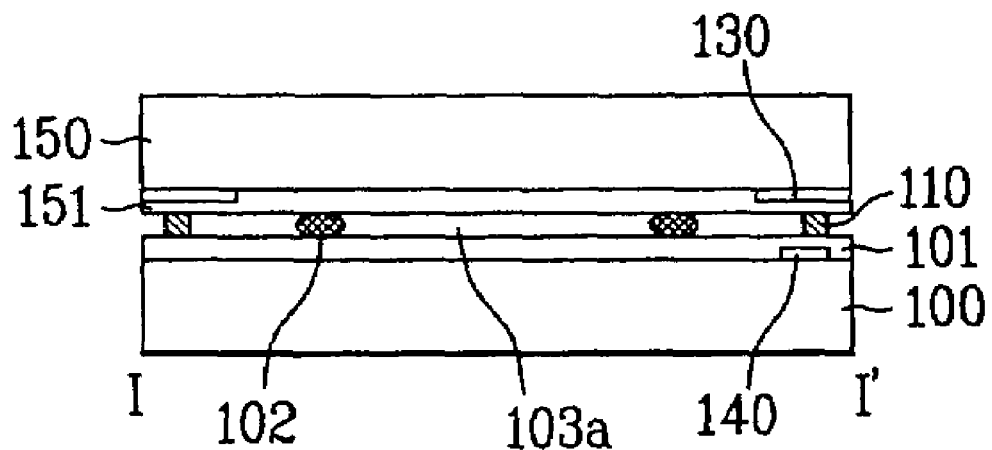
Figure 3:
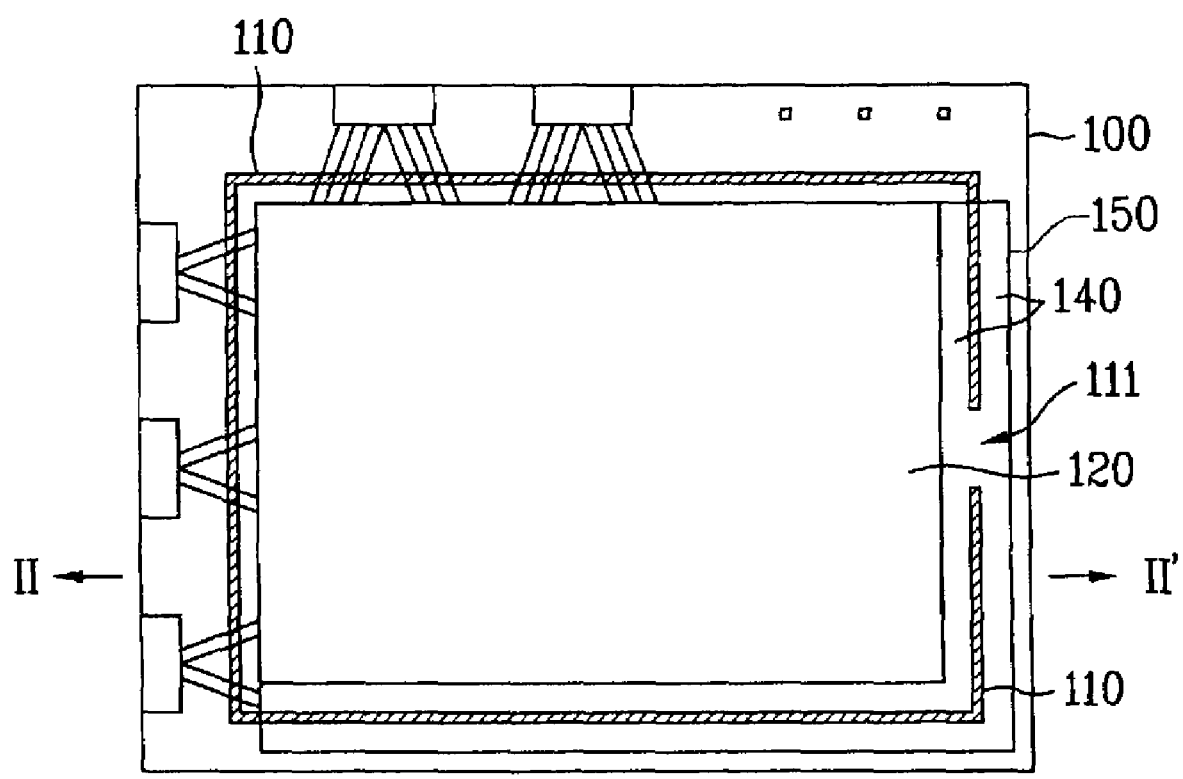
FIG. 3 is a plane view of another liquid crystal display device having a TFT substrate bonded onto a C/F substrate according to the related art.
Figure 4A:
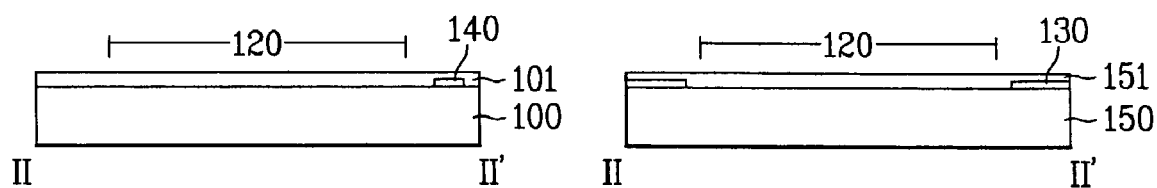
FIGS. 4A to 4D are cross-sectional views of a fabrication process of the along II-II' of FIG. 3 according to the related art.
Figure 4B:
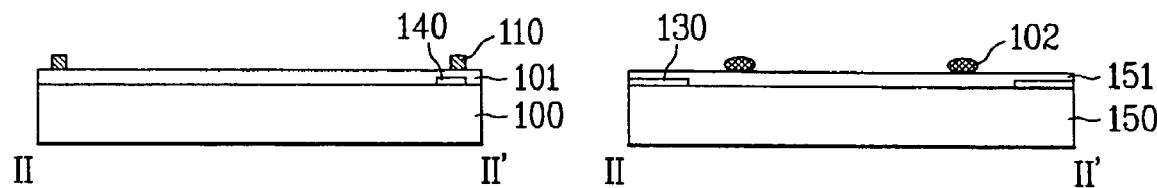
Figure 4C:
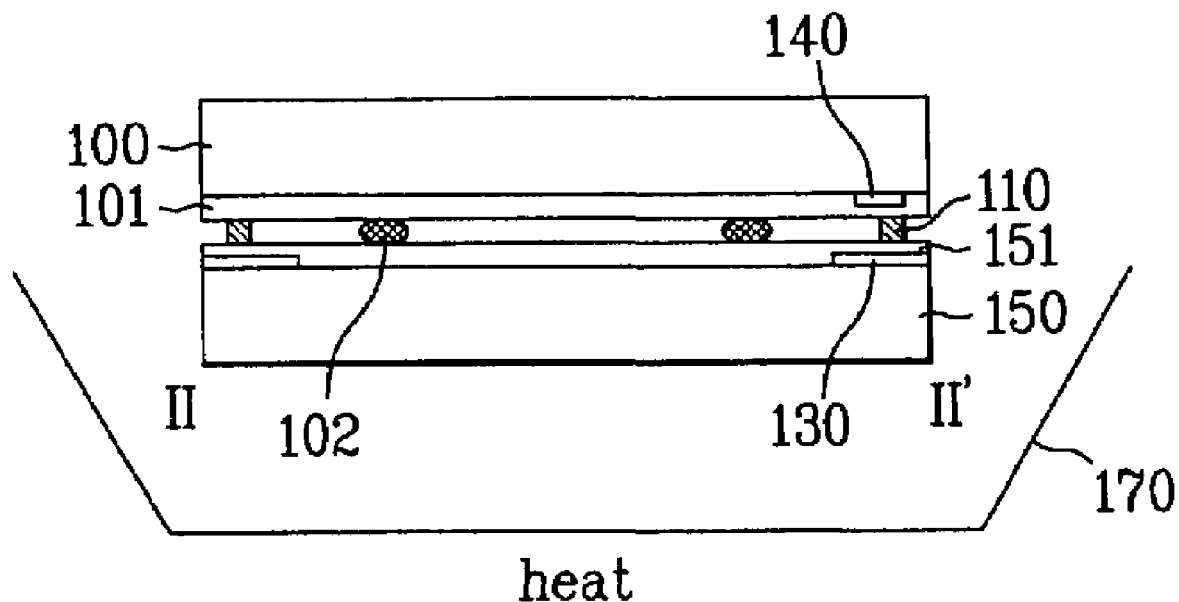
Figure 4D:
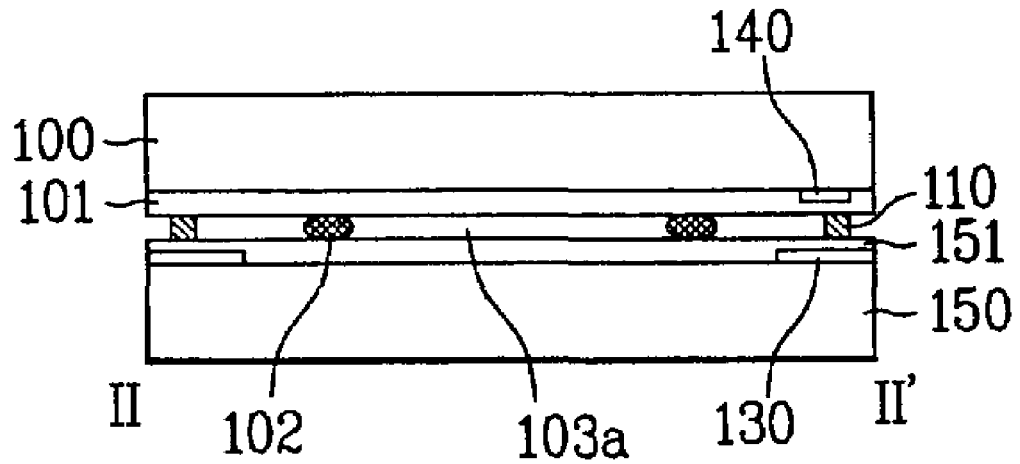
Figure 5:
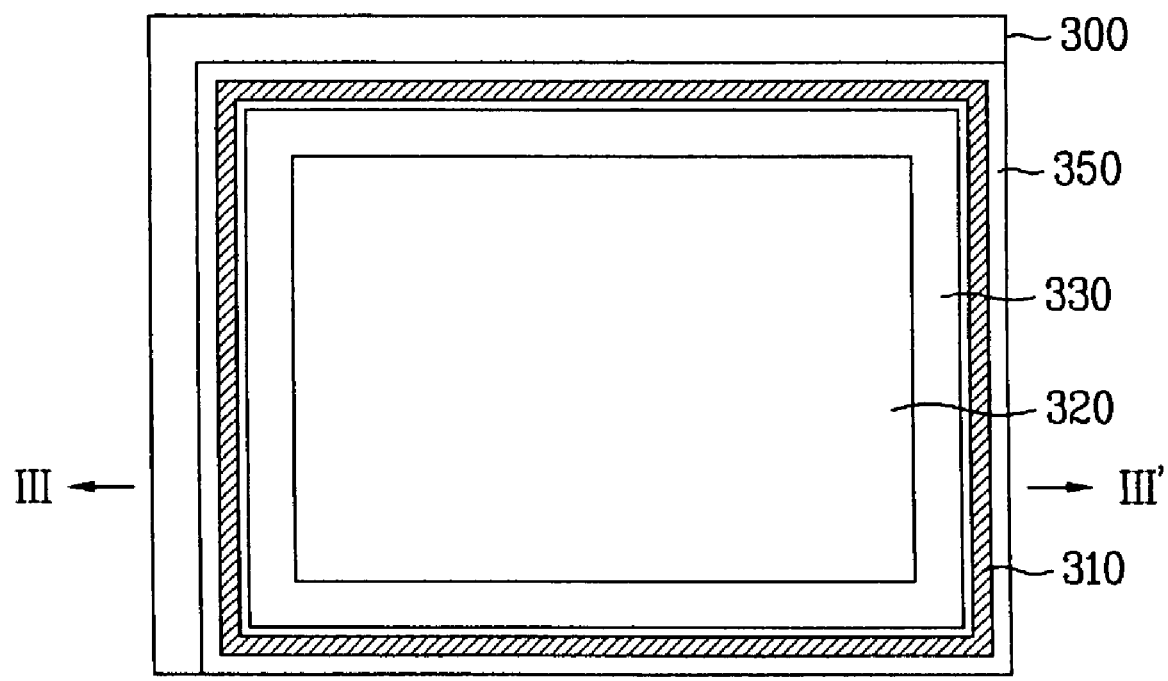
FIG. 5 is a plane view of an exemplary liquid crystal display device having a C/F substrate bonded onto a TFT substrate according to the present invention.

FIG. 5 is a plane view of an exemplary liquid crystal display device having a C/F substrate bonded onto a TFT substrate according to the present invention. In FIG. 5, a UV- and thermo-hardening sealant 310 may be coated on a second substrate 350 having a color filter array formed in an active area 320 and a black matrix layer 330 may be formed along a periphery of the active area 320. Liquid crystal material may be dropped onto a first substrate 300 having a thin film transistor array formed in the active area 320 and a metal pattern may be formed along one side of the periphery of the active layer 320. Then, the second substrate 350 may be inverted so that a portion of the second substrate 350 having the sealant 310 coated thereon faces a lower direction, and the second substrate 350 may be aligned over the first substrate 300. Next, the first and second substrates 300 and 350 are bonded to each other, and the UV- and thermo-hardening sealant 310 may be hardened.

A line width of the black matrix layer 330 formed along the periphery of the active area 320 may be reduced so that the UV- and thermo-hardening sealant 310 may be spaced apart from the black matrix layer 330, whereby UV light may be applied to the UV- and thermo-hardening sealant 310. In addition, a plurality of spacers (not shown) may be formed between the first and second substrates 300 and 350 for maintaining a constant cell gap between the first and substrates 300 and 350.

The UV- and thermo-hardening sealant may include a resin having an acrylate functional group selected from a group including an epoxy acrylate resin, a urethane acrylate resin, and a polyester acrylate. The epoxy acrylate resin becomes relatively hard during the hardening process, while the urethane acrylate resin becomes soft during the hardening process. Accordingly, the epoxy acrylate and urethane acrylate resins may be reacted with UV-hardeners to create polymers. Thus, the UV-hardener forms active radicals when exposed to UV light, whereby each of the active radicals may react with double bonds of the acrylate functional group to radicalize the acrylate. Then, the active acrylate radical may be reacted with double bonds of another acrylate for polymerization. Accordingly, the series of reactions is commonly called a photo-hardening process.

Figure 6A:
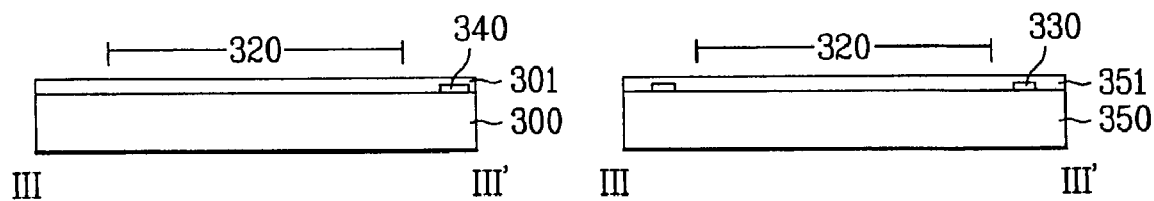
FIGS. 6A to 6E are cross-sectional views of an exemplary fabrication process of the liquid crystal display device along III-III' of FIG. 5 according to the present invention.

FIGS. 6A to 6E are cross-sectional views of an exemplary fabrication process of the liquid crystal display device along III-III' of FIG. 5 according to the present invention. In FIG. 6A, a first alignment layer 301 may be formed on a first substrate 300. Although not shown, the first substrate 300 may include a thin film transistor array having a plurality of gate lines, data lines, pixel electrodes, and thin film transistors formed within an active area 320. In addition, the first substrate 300 may include metal patterns 340 formed along one peripheral side of the active area 320, wherein the metal patterns may include a common line. Moreover, an adherence type spacer (not shown) may be formed on the first alignment layer 301. Alternatively, a column spacer (not shown) may be formed on the first substrate 300 before formation of the first alignment layer 301, wherein the first alignment layer 301 may be formed on an entire surface of the first substrate 300 including the column spacer.

Further in FIG. 6A, a second alignment layer 351 may be formed on a second substrate 350. Although not shown, the second substrate 350 may include a black matrix layer, a plurality of color filter layers, and a common electrode formed within the active area 320. In addition, the second substrate 350 may include a black matrix layer 330 formed along the periphery of the active area 320.

Figure 6B:
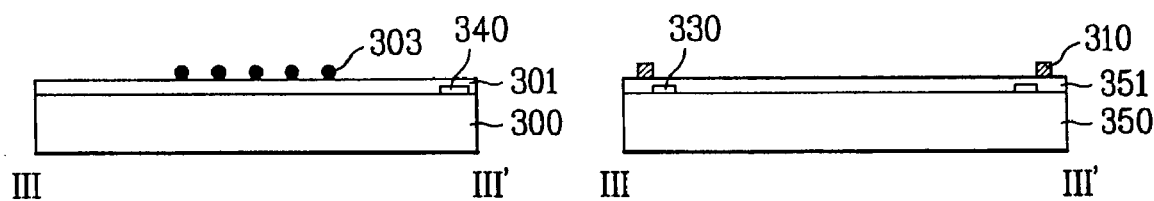

In FIG. 6B, liquid crystal material 303 may be dropped onto the first alignment layer 301 within the active area 320. Accordingly, the liquid crystal material may be dropped in a predetermined amount suitable for a size of a corresponding panel using a liquid crystal dispenser (not shown). A UV- and thermo-hardening sealant 310 may be formed along a periphery of the active area 320 on the second alignment layer 351, whereby the UV- and thermo-hardening sealant 310 may not directly overlie the black matrix layer 330. Accordingly, the UV- and thermo-hardening sealant 310 may be exposed to UV light through the second substrate 350 without the black matrix layer 330 acting as a mask for the UV- and thermo-hardening sealant 310.

Figure 6C:
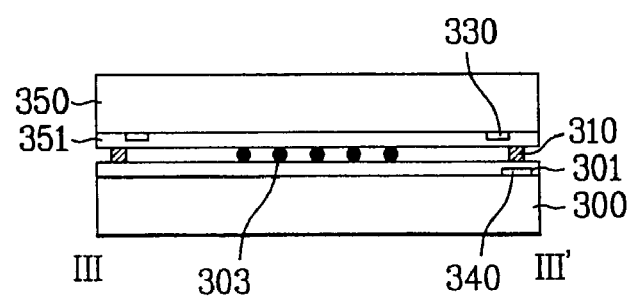

In FIG. 6C, the second substrate 350 may be inverted so that the UV- and thermo-hardening sealant 310 faces a lower direction. Next, the second substrate 350 may be placed over the first substrate 300, upon which the liquid crystal material 303 has been dropped, so as to be aligned with the first substrate 300. Then, the first and second substrates 300 and 350 may be initially bonded to each other in a vacuum chamber (not shown), and then removed from the vacuum chamber so that the initially bonded first and second substrates 300 and 350 are subjected to an atmospheric pressure. Thus, an additional bonding is performed due to a pressure differential between an interior and exterior of the initially bonded first and second substrates 300 and 350.

Figure 6D:
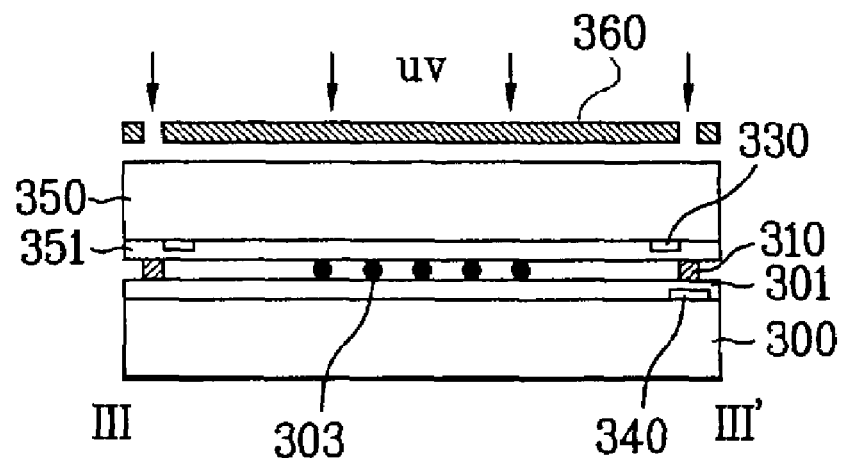

In FIG. 6D, UV light may be applied to the UV- and thermo-hardening sealant 310 of the initially bonded first and second substrates 300 and 350 using a mask 360, thereby partially hardening the UV- and thermo-hardening sealant 310 and further bonding the first and second substrates 300 and 350. Accordingly, relative placement of the UV- and thermo-hardening sealant 310 and the black matrix layer 330 allows the mask 360 to prevent the black matrix layer 330 from being exposed to the UV light. Namely, since a width of the black matrix layer 330 formed along the periphery of the active area 320 of the second substrate 350 is reduced and the UV- and thermo-hardening sealant 310 is not directly formed overlying the black matrix layer 330, the the UV- and thermo-hardening sealant 310 may be exposed to the UV light.

Figure 6E:
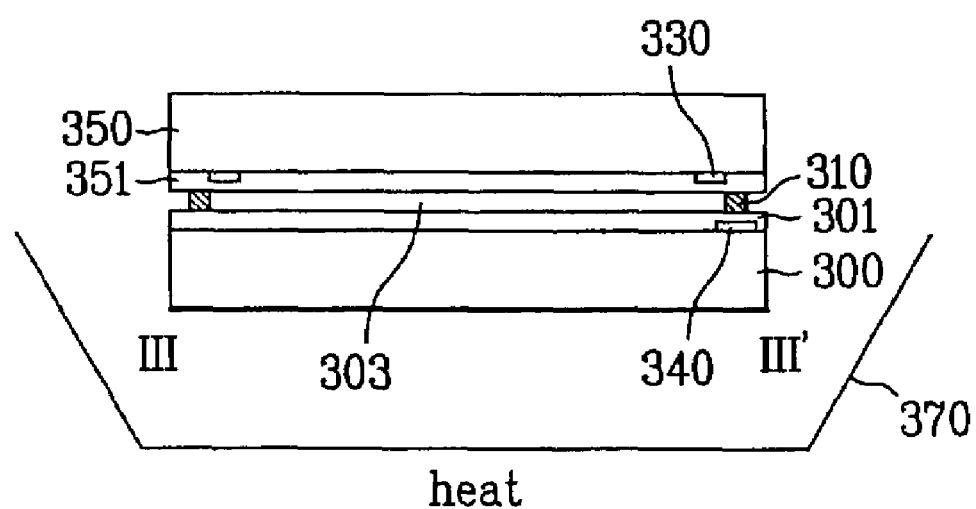

In FIG. 6E, the bonded first and second substrates 300 and 350 may be even further bonded using a thermo-hardening process at about 140° C. for about one hour in a thermo-hardening furnace. Accordingly, the liquid crystal material may spread evenly between the bonded first and second substrates 300 and 350.

Figure 7A:
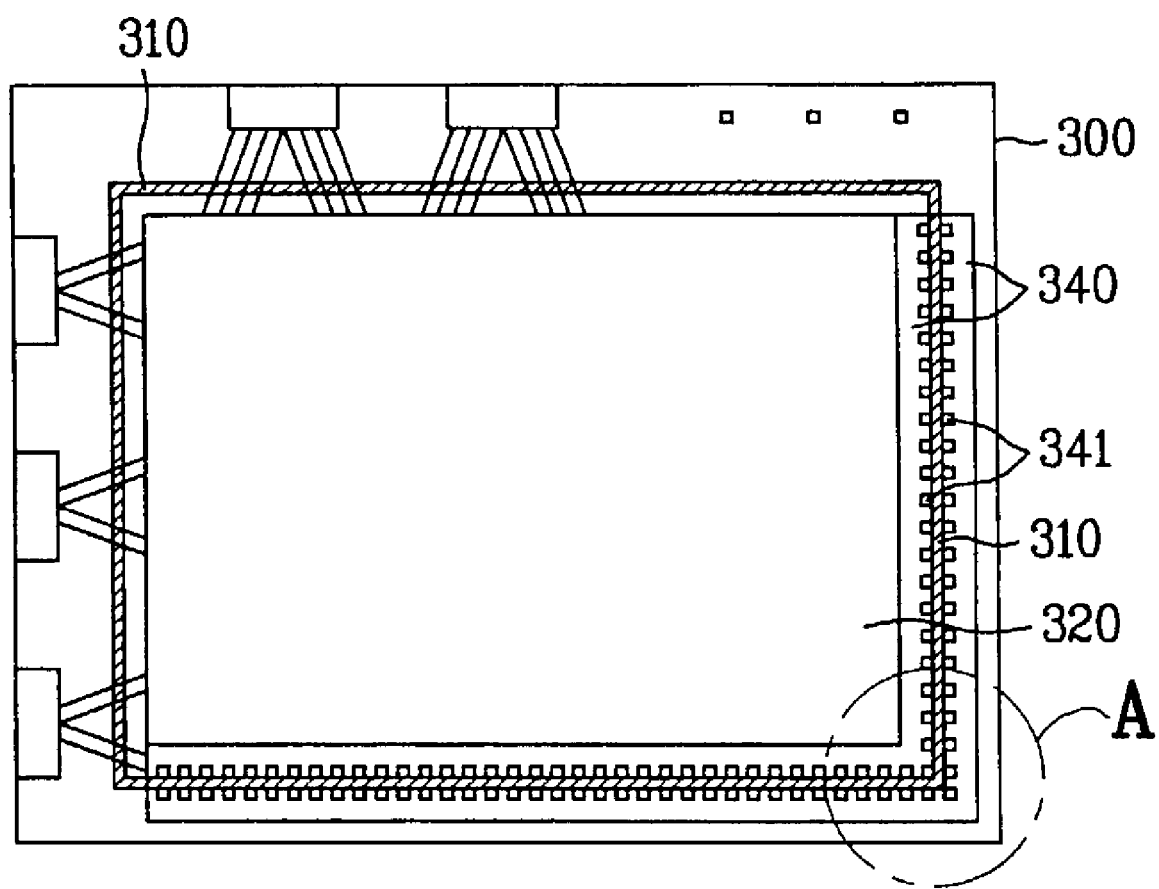
FIG. 7A is a plane view of another exemplary liquid crystal display device having a TFT array substrate placed at an upper side according to the present invention.
Figure 7B:
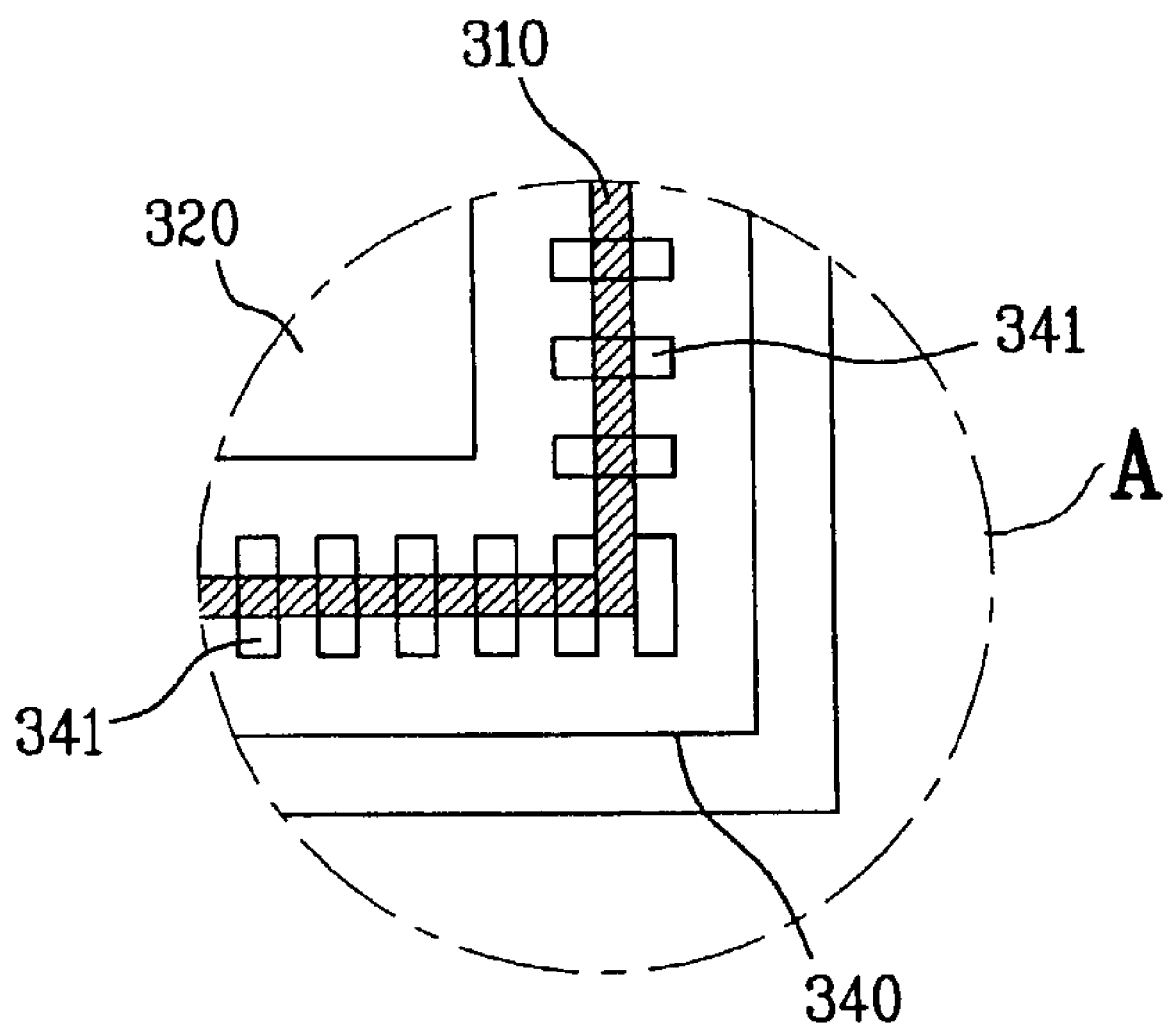
FIG. 7B is an expanded plane view of region A of FIG. 7A according to the present invention.

FIG. 7A is a plane view of another exemplary liquid crystal display device having a TFT array substrate placed at an upper side according to the present invention, and FIG. 7B is an expanded plane view of region A of FIG. 7A according to the present invention. In FIG. 7A, a first substrate 300 may include a thin film transistor array formed within an active area 320 and metal patterns 340 may be formed along one side of a periphery of the active area 320, wherein the metal patterns 340 may include a common line. Although not shown, the first substrate 300 may be aligned over a second substrate having a color filter array formed in the active area 320 and a black matrix layer may be formed along the periphery of the active area 320. Then, the first substrate 300 and the second substrate (not shown) may be bonded to each other.

In FIG. 7A, liquid crystal material may be dropped onto an active area of the second substrate (not shown) and a UV- and thermo-hardening sealant 310 may be formed on the metal patterns 340 along the periphery of the active area 320 of the first substrate 300. Accordingly, since the UV- and thermo-hardening sealant 310 may be formed on the metal patterns 340, a light irradiation path may be required for exposing the UV- and thermo-hardening sealant 310 to UV light.

In FIGS. 7A and 7B, a plurality of through-holes 341 may be formed in the metal patterns 340 along a central portion that will be coated with the UV- and thermo-hardening sealant 310. For example, each of the through-holes 341 may be rectangular to have a long axis along a direction normal to a direction of the UV- and thermo-hardening sealant 310. Although the through-holes 341 are shown to be rectangular, most any shape may be sufficient to provide exposure of the UV- and thermo-hardening sealant 310 to UV light.

Figure 8A:
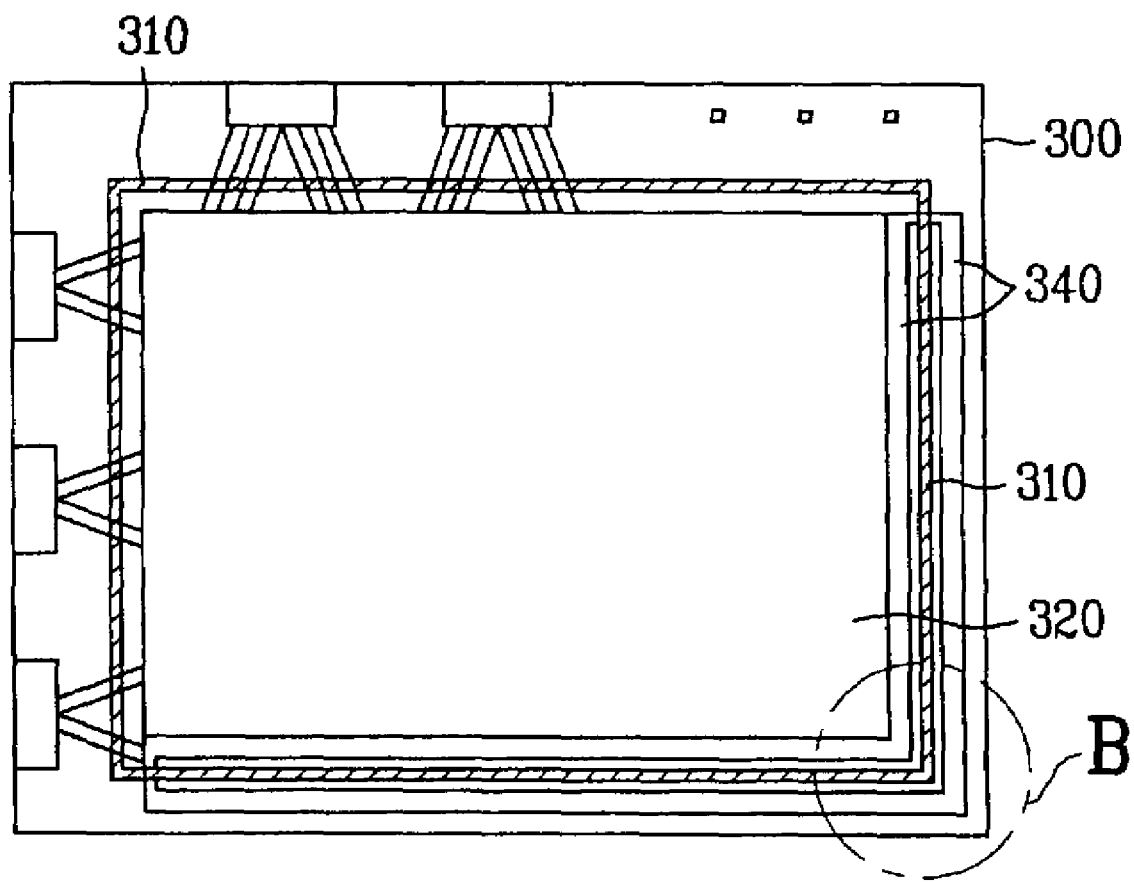
FIG. 8A is a plane view of another exemplary liquid crystal display device having a TFT array substrate placed at an upper side according to the present invention.
Figure 8B:
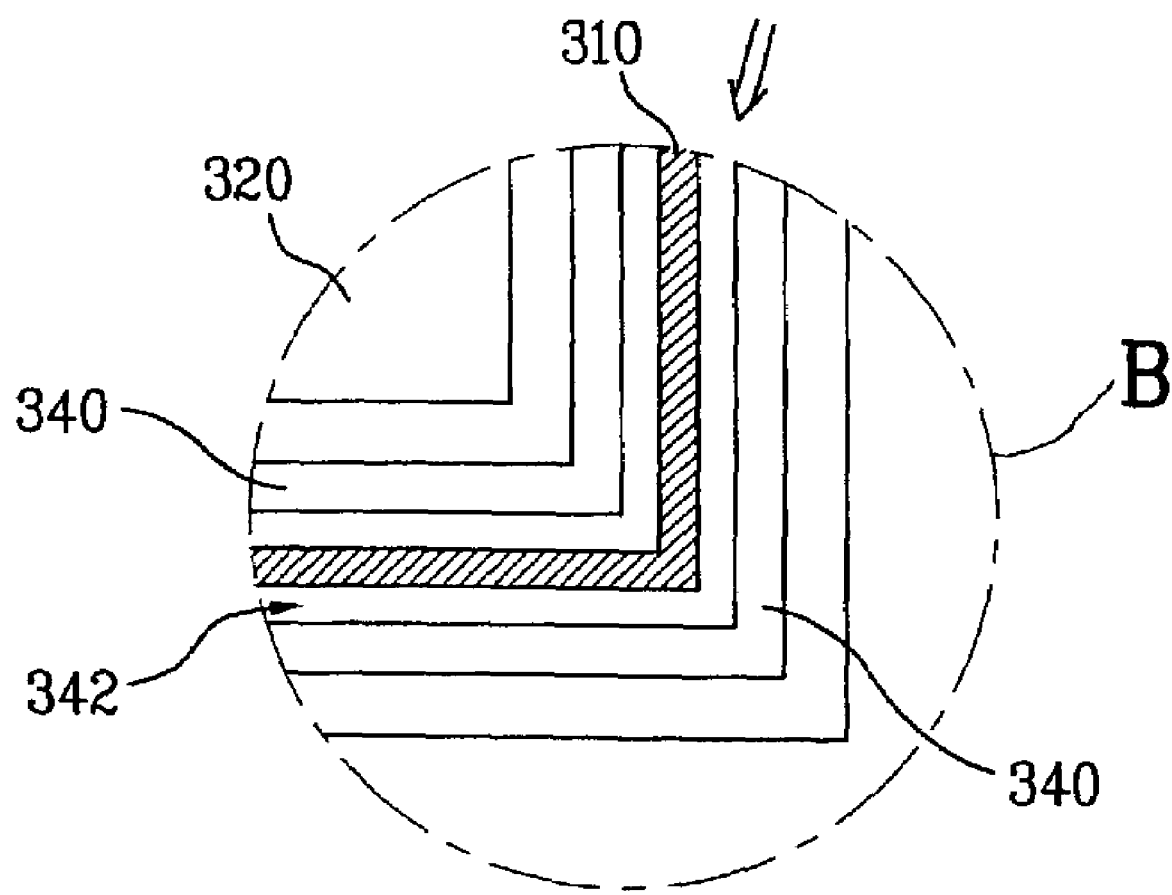
FIG. 8B is an expanded plane view of region B of FIG. 8A according to the present invention.

FIG. 8A is a plane view of another exemplary liquid crystal display device having a TFT array substrate placed at an upper side according to the present invention, and FIG. 8B is an expanded plane view of region B of FIG. 8A according to the present invention. In FIG. 8A, liquid crystal material may be dropped onto an active area of the second substrate (not shown) and a UV- and thermo-hardening sealant 310 may be formed on the metal patterns 340 along the periphery of the active area 320 of the first substrate 300. Accordingly, since the UV- and thermo-hardening sealant 310 may be formed on the metal patterns 340, a light irradiation path may be required for exposing the UV- and thermo-hardening sealant 310 to UV light.

In FIGS. 8A and 8B, a slot 342 may be formed in the metal patterns 340 along a central portion that will be coated with the UV- and thermo-hardening sealant 310. For example, the slot 342 may be rectangular to have a long axis along a direction parallel to a direction of the UV- and thermo-hardening sealant 310. Although the slot 342 is shown to be rectangular, most any shape may be sufficient to provide exposure of the UV- and thermo-hardening sealant 310 to UV light.

Figure 9A:
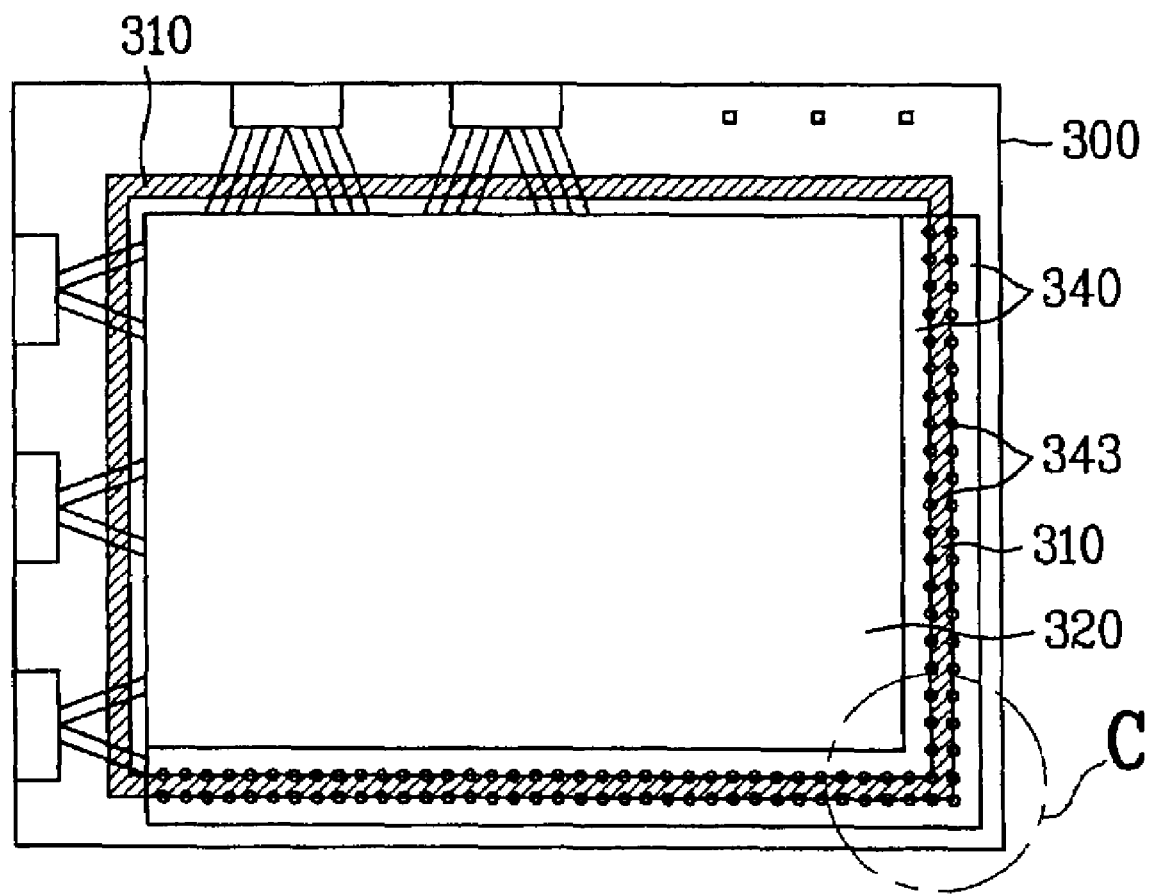
FIG. 9A is a plane view of another exemplary liquid crystal display device having a TFT array substrate placed at an upper side according to the present invention.
Figure 9B:
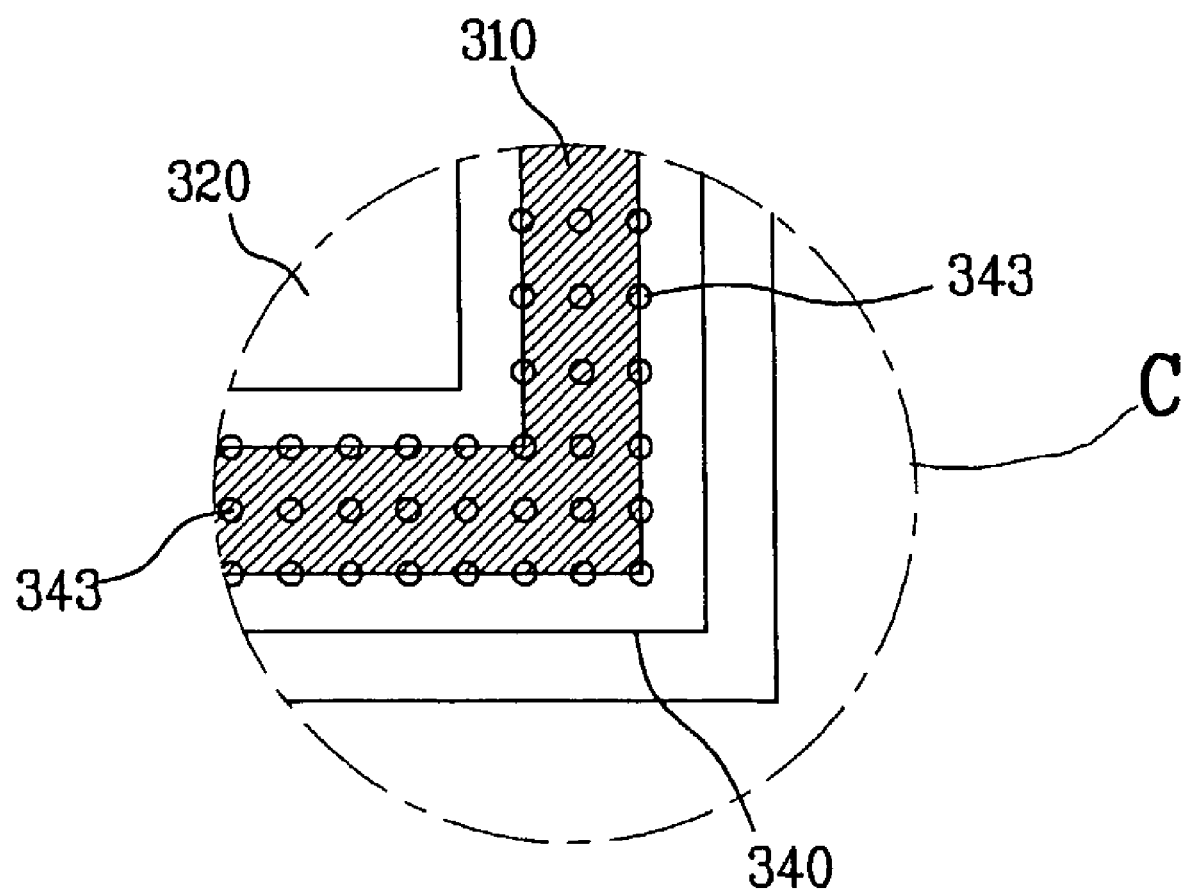
FIG. 9B is an expanded plane view of region C of FIG. 9A according to the present invention.

FIG. 9A is a plane view of another exemplary liquid crystal display device having a TFT array substrate placed at an upper side according to the present invention, and FIG. 9B is an expanded plane view of region C of FIG. 9A according to the present invention. In FIG. 9A, a first substrate 300 may include a thin film transistor array formed within an active area 320 and metal patterns 340 may be formed along one side of a periphery of the active area 320, wherein the metal patterns 340 may include a common line. Although not shown, the first substrate 300 may be aligned over a second substrate having a color filter array formed in the active area 320 and a black matrix layer may be formed along the periphery of the active area 320. Then, the first substrate 300 and the second substrate (not shown) may be bonded to each other.

In FIG. 9A, liquid crystal material may be dropped onto an active area of the second substrate (not shown) and a UV- and thermo-hardening sealant 310 may be formed on the metal patterns 340 along the periphery of the active area 320 of the first substrate 300. Accordingly, since the UV- and thermo-hardening sealant 310 may be formed on the metal patterns 340, a light irradiation path may be required for exposing the UV- and thermo-hardening sealant 310 to UV light.

In FIGS. 9A and 9B, a plurality of through-holes 343 may be formed in the metal patterns 340 along a central portion that will be coated with the UV- and thermo-hardening sealant 310. For example, each of the through-holes 343 may be circular and may be positioned along directions both normal and parallel to a direction of the UV- and thermo-hardening sealant 310. Although the through-holes 343 are shown to be circular, most any shape may be sufficient to provide exposure of the UV- and thermo-hardening sealant 310 to UV light.

Figure 10A:
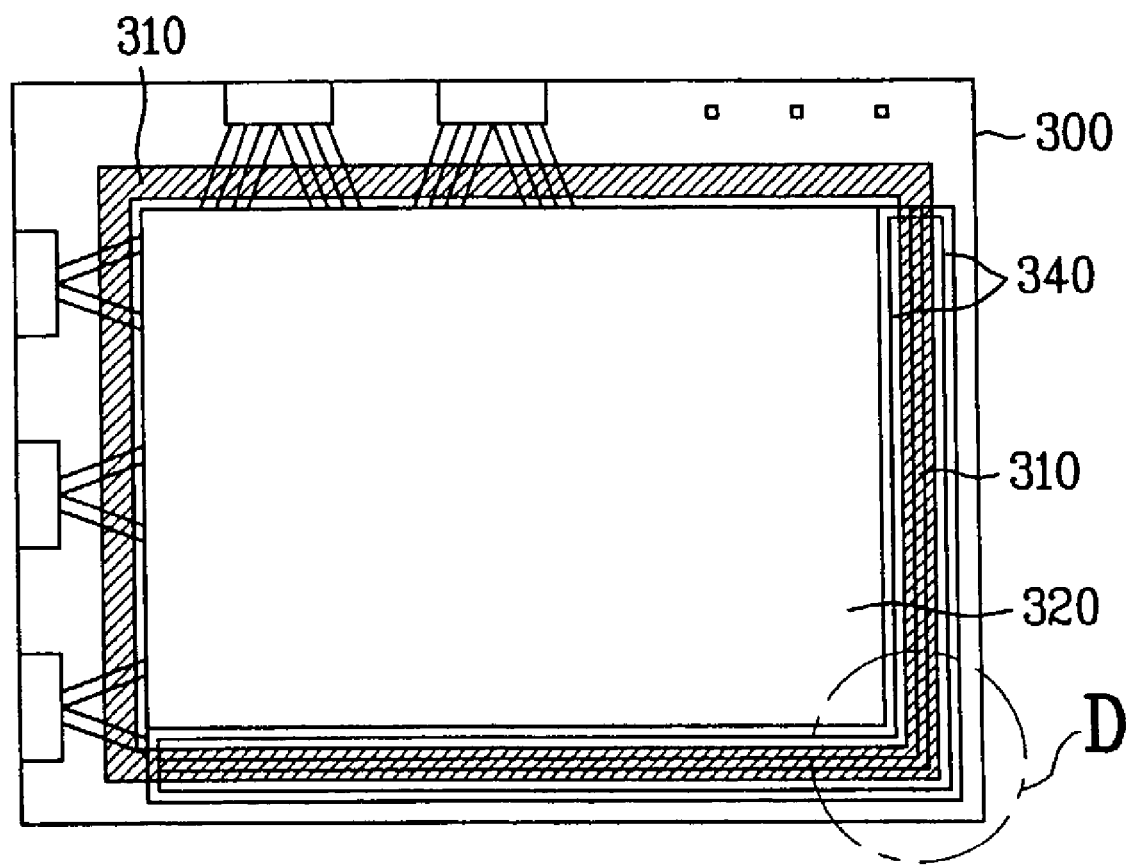
FIG. 10A is a plane view of another exemplary liquid crystal display device having a TFT array substrate placed at an upper side according to the present invention.
Figure 10B:
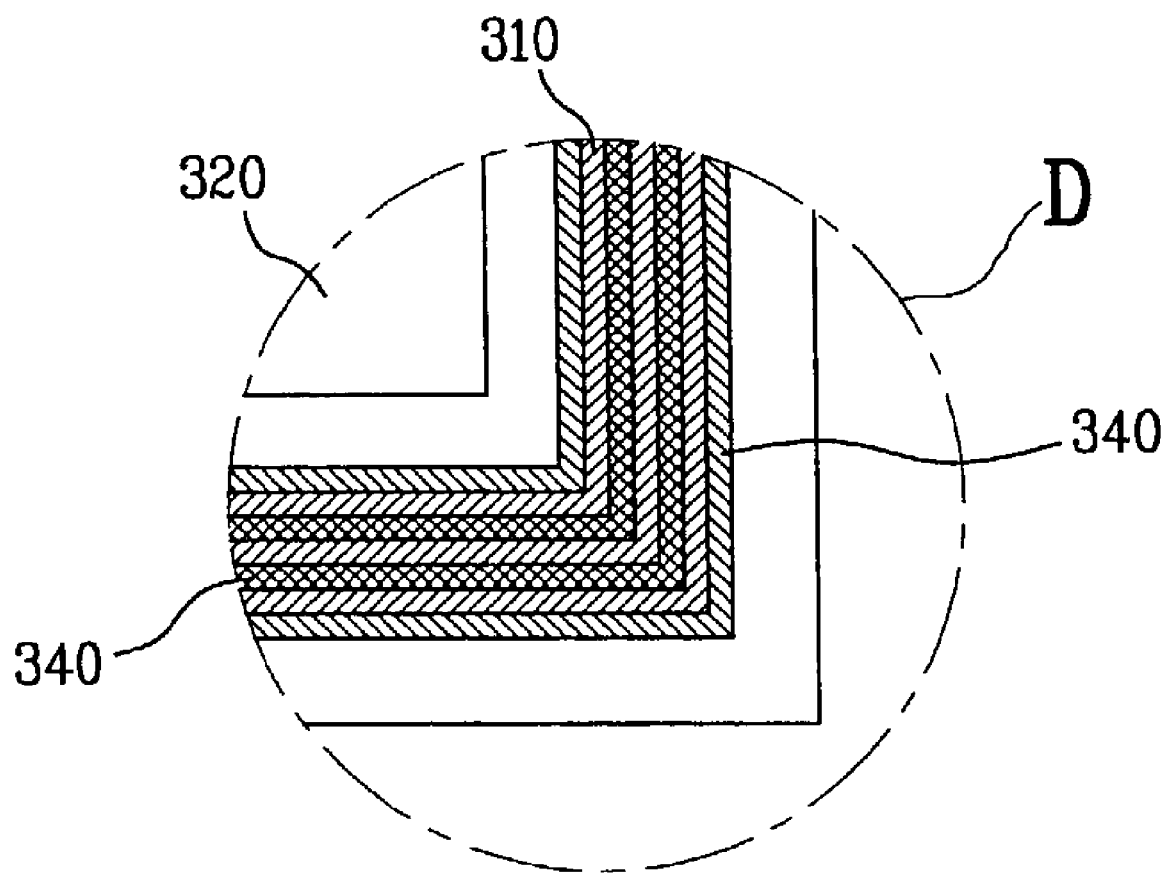
FIG. 10B is an expanded plane view of region D of FIG. 10A according to the present invention.

FIG. 10A is a plane view of another exemplary liquid crystal display device having a TFT array substrate placed at an upper side according to the present invention, and FIG. 10B is an expanded plane view of region D of FIG. 10A according to the present invention. In FIG. 10A, liquid crystal material may be dropped onto an active area of the second substrate (not shown) and a UV- and thermo-hardening sealant 310 may be formed between metal patterns 340 along the periphery of the active area 320 of the first substrate 300. Accordingly, since the UV- and thermo-hardening sealant 310 may be formed between the metal patterns 340, a light irradiation path may be required for exposing the UV- and thermo-hardening sealant 310 to UV light.

In FIGS. 10A and 10B, the metal patterns 340 may be formed of a plurality of equally-spaced parallel lines along a central portion. Then, the UV- and thermo-hardening sealant 310 may be placed between each of the metal patterns 340. If the metal patterns 340 are to function as a common line, then the metal patterns 340 should have a minimum width to provide a specific resistance to supply a common voltage. In addition, a distance between adjacent metal patterns 340 should greater than at least about 50 μm to sufficiently expose the UV- and thermo-hardening sealant 310 to UV light. Accordingly, the plurality of equally-spaced parallel lines should be about 50~100 μm wide and be equally-spaced at an interval of about 50~100 μm. For example, the metal pattern 340 may be the common line of a TN or VA mode liquid crystal display device or a black matrix layer cutting off backlight in an IPS mode liquid crystal display device. Moreover, a material of the metal pattern 340 may be a material from which to form gate lines in a liquid crystal display device such as Al, Cr, Mo, Cu, Nd, and an Al alloy.

Figure 11A:
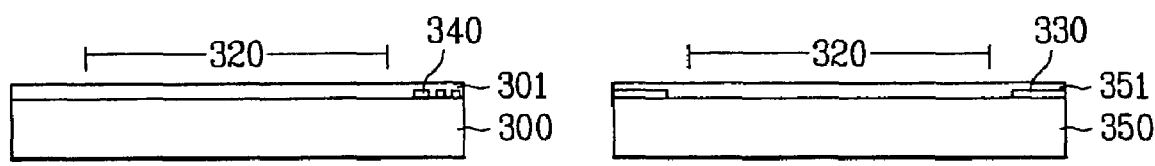
FIGS. 11A to 11E are cross-sectional views of another exemplary fabrication process for a liquid crystal display device by having a TFT array substrate placed at an upper side according to the present invention.

FIGS. 11A to 11E are cross-sectional views of another exemplary fabrication process for a liquid crystal display device by having a TFT array substrate placed at an upper side according to the present invention. In FIG. 11A, a first substrate may include a thin film transistor array may be formed in an active area 320, metal patterns 340 formed along a peripheral side of the active area 320, and a first alignment layer 301. Although not shown, the thin film transistor array may include a plurality of gate lines, data lines, pixel electrodes, and thin film transistors. The metal patterns 340 may include any of the metal patterns 340 shown in any of FIGS. 7A-10B, and may include through-holes, slits, or fine lines. Alternatively, the metal patterns 340 may include a combination of through-holes, slits, and/or fine lines.

In FIG. 11A, a second substrate 350 may include a second alignment layer 351 and a black matrix layer 330 formed along a periphery of the active 320. Although not shown, the second substrate 350 may include a plurality of color filter layers and a common electrode formed in the active area 320. In addition, an adherence type spacer (not shown) may be formed on one or both of the first and second alignment layers 301 and 351. Alternatively, a column spacer (not shown) may be formed one or both of the first and second substrates 300 and 350 before formation of the first and second alignment layers 301 and 351, wherein the first and second alignment layers 301 351 may be formed on an entire surface of the first and second substrates 300 and 350, respectively.

Figure 11B:
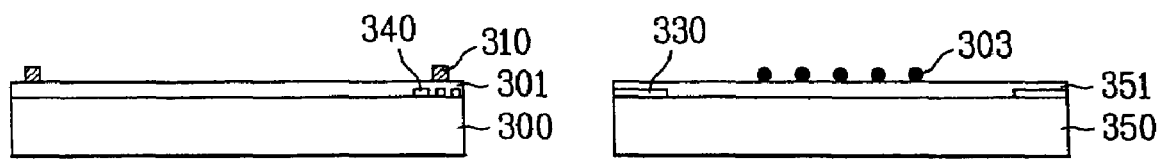

In FIG. 11B, liquid crystal material 303 may be dropped onto the second alignment layer 351 within the active area 320. Accordingly, the liquid crystals may be dropped in a predetermined amount suitable for a size of a corresponding panel using a liquid crystal dispenser (not shown). Then, a UV- and thermo-hardening sealant 310 may be formed on the first alignment layer 301 along a periphery of the active area 320. The metal patterns 340 may be formed so that the UV- and thermo-hardening sealant 310 may be sufficiently exposed to UV light. Accordingly, the metal patterns 340 may include through-holes, slit, and/or fine lines formed in the metal patterns 340.

Figure 11C:
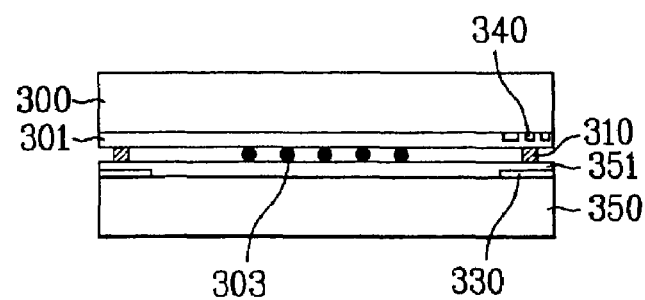

In FIG. 11C, the first substrate 300 may be inverted so that the UV- and thermo-hardening sealant 310 faces a lower direction. Next, the first substrate 300 may be placed over the second substrate 350, upon which the liquid crystal material 303 has been dropped, to be aligned with the second substrate 350. Then, the first and second substrates 300 and 350 may be initially bonded to each other in a vacuum chamber (not shown), and then removed from the vacuum chamber so that the initially bonded first and second substrates 300 and 350 are subjected to an atmospheric pressure. Thus, an additional bonding is performed due to a pressure differential between an interior and exterior of the initially bonded first and second substrates 300 and 350.

Figure 11D:
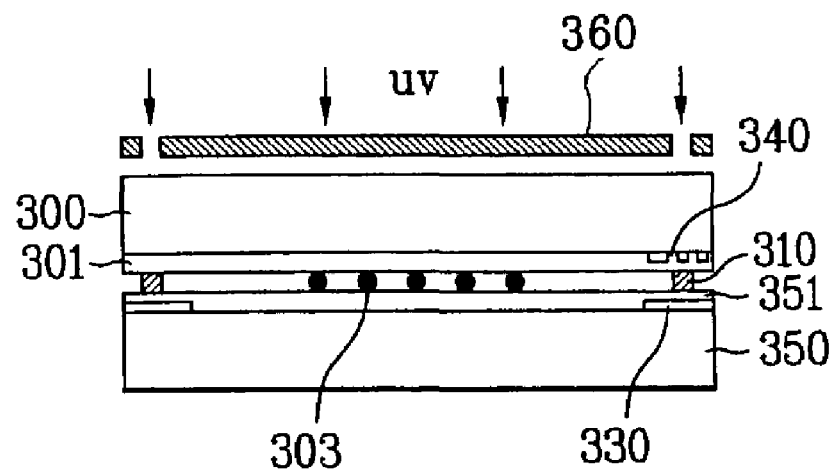

In FIG. 11D, UV light may be applied to the UV- and thermo-hardening sealant 310 of the initially bonded first and second substrates 300 and 350 through the metal patterns 340 using a mask 360, thereby partially hardening the UV- and thermo-hardening sealant 310 and further bonding the first and second substrates 300 and 350. Accordingly, relative placement of the UV- and thermo-hardening sealant 310 and the black matrix layer 330 allows the mask 360 to prevent the black matrix layer 330 from being exposed to the UV light. Namely, since a width of the black matrix layer 330 formed along the periphery of the active area 320 of the second substrate 350 is reduced and the UV- and thermo-hardening sealant 310 is not directly formed overlying the black matrix layer 330, the UV- and thermo-hardening sealant 310 may be exposed to the UV light.

Figure 11E:
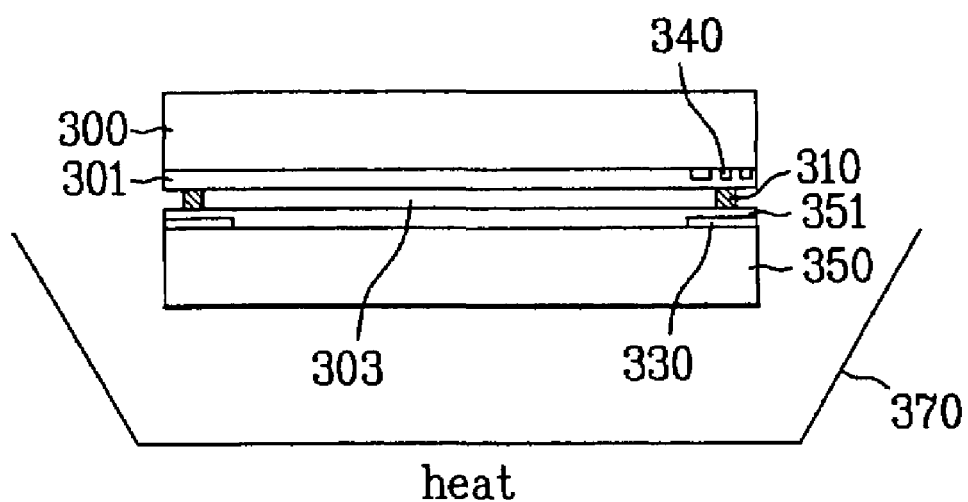

In FIG. 11E, the bonded first and second substrates 300 and 350 may be even further bonded using a thermo-hardening process at about 140° C. for about one hour in a thermo-hardening furnace. Accordingly, the liquid crystal material may spread evenly between the bonded first and second substrates 300 and 350.

Figure 12A:
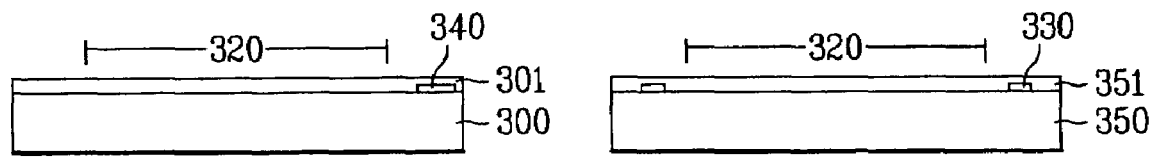
FIGS. 12A to 12E are cross-sectional views of another exemplary fabrication process for a liquid crystal display device according to the present invention.

FIGS. 12A to 12E are cross-sectional views of another exemplary fabrication process for a liquid crystal display device according to the present invention. In FIG. 12A, a first alignment layer 301 may be formed on a first substrate 300, and a metal pattern 340, such as a common line, may be formed along one peripheral side of an active area 320. Although not shown, the first substrate 300 may include a thin film transistor array having a plurality of gate lines, data lines, pixel electrodes, and thin film transistors formed in the active area 320

In FIG. 12A, a second alignment layer 351 may be formed on a second substrate 350, and a relatively narrow black matrix layer 330 may be formed along a periphery of an active area 320. Although not shown, the second substrate 350 may include a plurality of color filter layers and a common electrode formed in the active area 320.

Figure 12B:
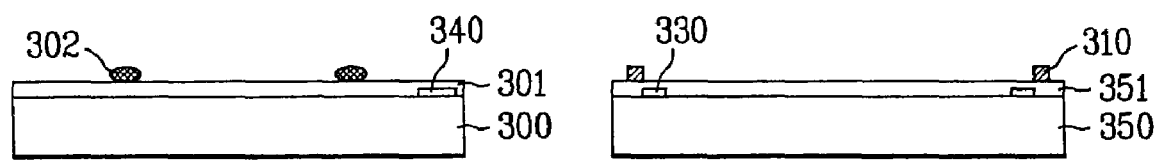

In FIG. 12B, a plurality of spacers 302 may be formed on the first alignment layer 301, and a UV- and thermo-hardening sealant 310 may be formed along the periphery of the active area 320. The UV- and thermo-hardening sealant 310 may be formed along a periphery region of the black matrix layer 330, thereby exposing the UV- and thermo-hardening sealant 310. In addition, the UV- and thermo-hardening sealant 310 may be formed to include a liquid crystal material injection inlet.

Figure 12C:
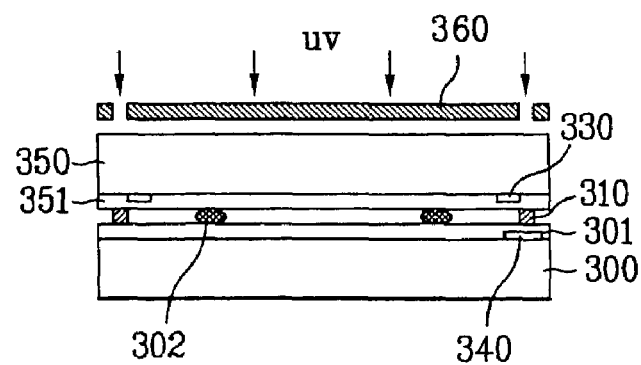

In FIG. 12C, the second substrate 350 may be inverted so that the UV- and thermo-hardening sealant 310 faces a lower direction. Then, the second substrate 350 may be placed over the first substrate 300, upon which the spacers 302 are formed, to be aligned with the first substrate 300. Next, the first and second substrates 300 and 350 are initially bonded to each other.

After the initial bonding of the first and second substrates 300 and 350, UV light may be applied to the UV- and thermo-hardening sealant 310 of the initially bonded first and second substrates 300 and 350 using a mask 360, thereby partially hardening the UV- and thermo-hardening sealant 310 and further bonding the first and second substrates 300 and 350. Accordingly, relative placement of the UV- and thermo-hardening sealant 310 and the black matrix layer 330 allows the mask 360 to prevent the black matrix layer 330 from being exposed to the UV light. Namely, since a width of the black matrix layer 330 formed along the periphery of the active area 320 of the second substrate 350 is reduced and the UV- and thermo-hardening sealant 310 is not directly formed overlying the black matrix layer 330, the UV- and thermo-hardening sealant 310 may be exposed to the UV light.

Figure 12D:
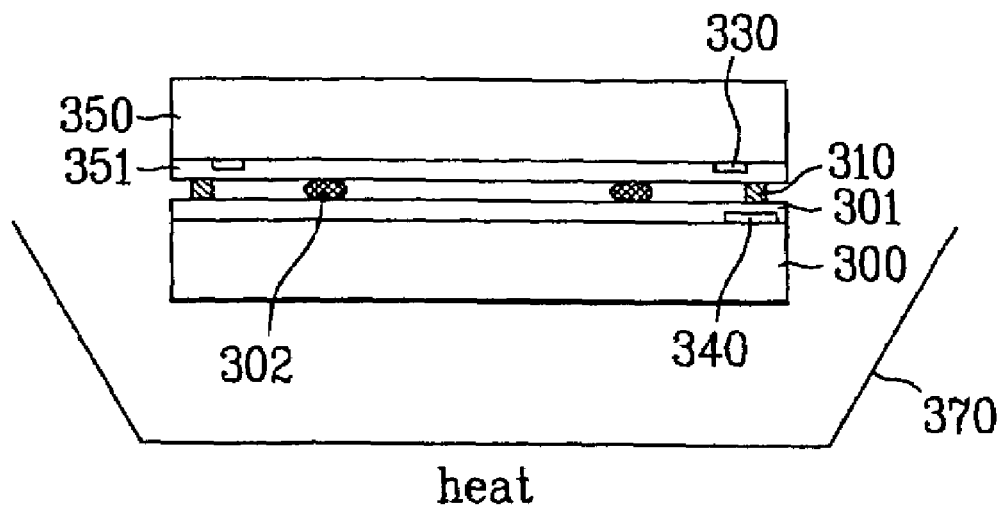

In FIG. 12D, the photo-hardened first and second substrates 300 and 350 may be even further bonded by thermo-hardening at about 140° C. for about one hour in a thermo-hardening furnace 370.

Figure 12E:
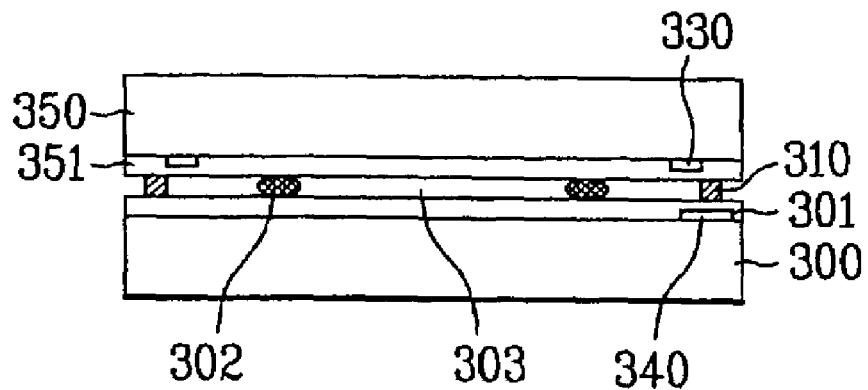

In FIG. 12E, liquid crystal material 303 may be injected into an inner cavity formed between the bonded first and second substrates 300 and 350 through the injection inlet formed in the the UV- and thermo-hardening sealant 310 using a liquid crystal injection process. The liquid crystal injection process may be carried out by vacuum injection by making use of a pressure differential between the inner cavity and exterior surfaces of the bonded first and second substrates 300 and 350 in a vacuum chamber (not shown). Then, the injection inlet may be sealed after completion of the liquid crystal injection process.

FIGS. 13A to 13H are plane and cross-sectional views of exemplary liquid crystal dropping processes according to the present invention. A liquid crystal dropping process may include forming a plurality of individual panels on a mother substrate to simultaneously process and form the plurality of individual panels. Then, the mother substrate may be cut into individual unit panels corresponding to the plurality of individual panels, which is in contrast to forming a single unit panel on a single substrate.

In all modes of liquid crystal display devices except IPS modes, a common line may be formed on a thin film transistor array substrate and a common electrode may be formed on a color filter array. Accordingly, silver dots may be formed between the thin film transistor and color filter array substrates to electrically interconnect the common line and common electrode.

Figure 13A:
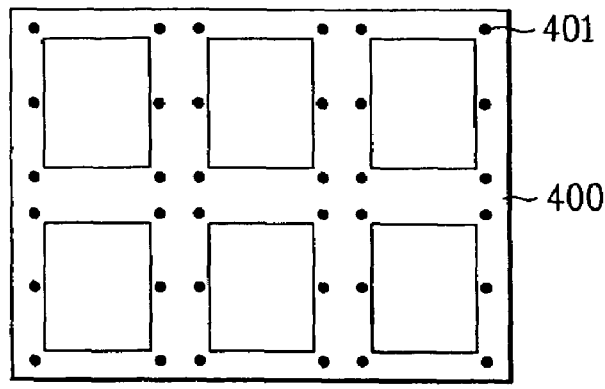
FIGS. 13A to 13H are plane and cross-sectional views of exemplary liquid crystal dropping processes according to the present invention.

In FIG. 13A, a plurality of silver dots 401 may be formed along a circumference of each individual panel of a first substrate 400, whereby a predetermined interval between adjacent silver dots 401 is maintained.

Figure 13B:
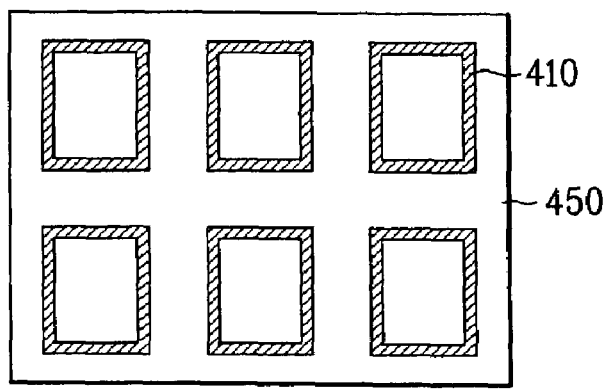

In FIG. 13B, a UV- and thermo-hardening sealant 410 may be formed along a circumference of individual panels of a second substrate 450.

Figure 13C:
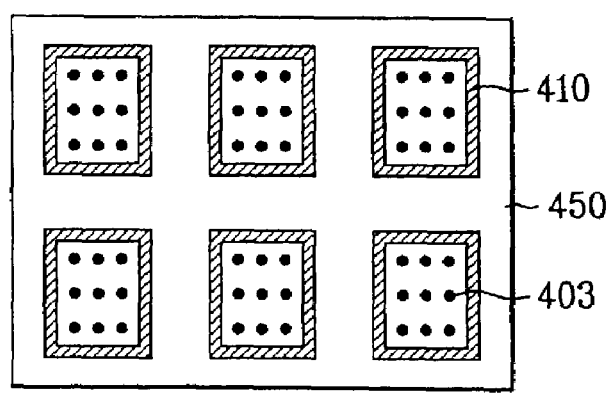

In FIG. 13C, a predetermined amount of liquid crystal material 403 may be deposited (i.e., dropped) inside a portion of each of the individual panels of the second substrate 450 defined by the UV- and thermo-hardening sealant 410.

Figure 13D:
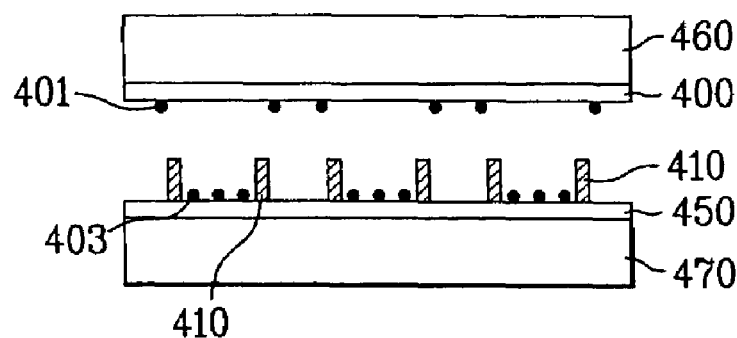

In FIG. 13D, the first substrate 400 having the silver dots 401 may be inverted to be fixed to an upper stage 460 of a bonding apparatus, thereby allowing the first substrate to move along a vertical direction (i.e., upward and downward). The second substrate 450 having the liquid crystal material may be fixed onto a lower stage 470 of the bonding apparatus, thereby allowing the second substrate 450 to move along a horizontal direction (i.e., left and right directions). Then, a pressure in an interior of the bonding apparatus may be reduced using a vacuum source.

Figure 13E:
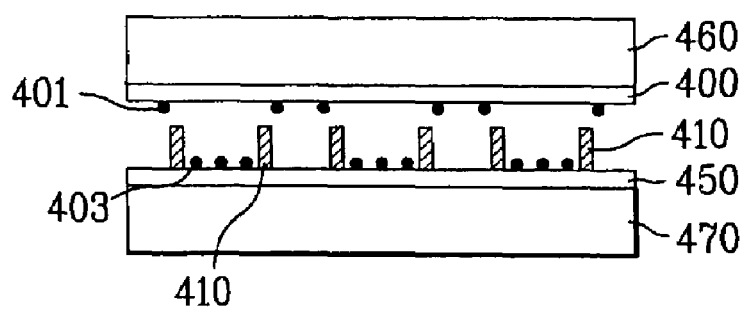

In FIG. 13E, the upper and lower stages 460 and 470 may be aligned with each other to position the silver dots 401 outside the UV- and thermo-hardening sealant 410 formed on the second substrate 450.

Figure 13F:
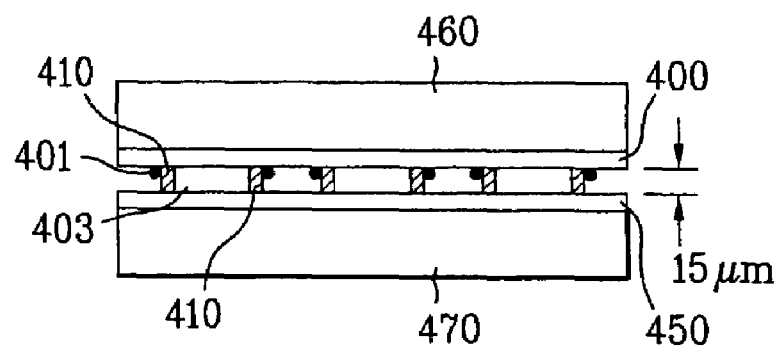

In FIG. 13F, the first and second substrates 400 and 450 may be bonded to each other by moving the upper stage 460 along the downward direction to maintain a gap of about 15 μm between the first and second substrates 400 and 450, thereby initially bonding them together.

Figure 13G:
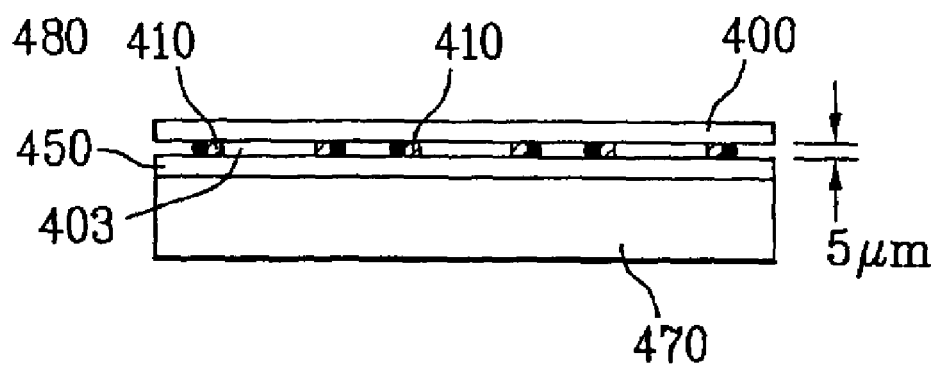

In FIG. 13G, after the first and second substrates 400 and 450 have been initially bonded to each other, the upper stage 460 is moved along the upward direction to be separated from the initially bonded first and second substrates 400 and 450. Then, an interior of the bonding apparatus may be changed from the reduced pressure state to an atmospheric state. Accordingly, a space between the bonded substrates remains at the reduced pressure state while exterior surfaces of the bonded substrates remain at the atmospheric state. Thus, a resulting pressure differential changes the gap between the bonded first and second substrates 400 and 450 to be about 5 μm.

Figure 13H:
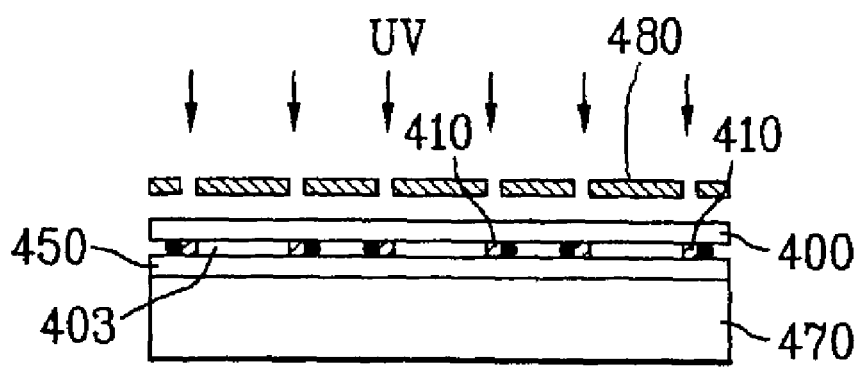

In FIG. 13H, UV light may be applied to the UV- and thermo-hardening sealant 410 using a patterned mask 480, whereby only the UV- and thermo-hardening sealant 410 is exposed to the UV light. Accordingly, photo-hardening of the UV- and thermo-hardening sealant 410 may be completed. Then, the UV- and thermo-hardening sealant 410 may be thermo-hardened in a thermo-furnace.

Alternatively, the silver dots 401 and the UV- and thermo-hardening sealant 410 may be formed on the first substrate 400 and the liquid crystal material 403 may be dropped on the second substrate 450. Moreover, one of the first and second substrates 400 and 450 may be a thin film transistor array substrate and the other of the first and second substrates 400 and 450 may be a color filter array substrate. Moreover, the UV- and thermo-hardening sealant may be used in a fabricating method of a liquid crystal display device using a liquid crystal injection process.

It will be apparent to those skilled in the art than various modifications and variations can be made in the method of fabricating liquid crystal display device of the present invention. Thus, it is intended that the present invention cover the modifications and variations of this invention provided they come within the scope of the appended claims and their equivalents.

What is claimed is:

1. A method of fabricating a liquid crystal display device, comprising:

forming a thin film transistor array on an active area of a first substrate;

forming a color filter layer and a black matrix layer on a second substrate;

forming a sealant along a peripheral portion of the second substrate;

bonding the first and second substrates;

hardening the sealant by exposure to light; and further hardening the sealant by exposure to heat after hardening the sealant by exposure to light, wherein the black matrix layer and the sealant are offset and do not overlap each other and a width of the black matrix is greater than that of the sealant so as not to expose the black matrix to the light used to harden the sealant, wherein the sealant includes a UV and thermo-hardening sealant material.

2. The method according to claim 1, wherein hardening the sealant by exposure to light includes use of a mask.

3. The method according to claim 2, wherein the mask transmits the light to a portion of the second substrate formed with the sealant.

4. The method according to claim 1, further comprising dropping liquid crystal material on the first substrate before bonding the first and second substrates.

5. The method according to claim 1, further comprising injecting liquid crystal material between the first and second substrates after hardening the sealant by exposure to light.

6. The method according to claim 1, wherein bonding the first and second substrates includes inverting the second substrate and positioning the second substrate over the first substrate.

7. The method according to claim 1, wherein the sealant includes UV hardening sealant.

8. A method of fabricating a liquid crystal display device, comprising:

forming a thin film transistor within an active area of a first substrate;

forming a color filter layer and a black matrix on a second substrate;

forming a photo-hardening and thermo-hardening sealant along a periphery of the active area;

bonding the first and second substrates;

hardening the sealant by exposure to light; and further hardening the sealant by exposure to heat after hardening the sealant by exposure to light, wherein the active area is bounded by a metal pattern having a plurality of through-holes, the black matrix layer and the sealant are offset and do not overlap each other, and a width of the black matrix is greater than that of the sealant so as to form an irradiation path, wherein the black matrix is not exposed to the light used to harden the sealant.

9. The method according to claim 8, wherein hardening the sealant by exposure to light includes application of the light to the first substrate using a mask.

10. The method according to claim 9, wherein the mask transmits the light to a portion of the second substrate formed with the sealant.

11. The method according to claim 8, further comprising dropping liquid crystal material onto the second substrate before bonding the first and second substrates.

12. The method according to claim 8, further comprising injecting liquid crystal material between the first and second substrates after hardening the sealant by exposure to light.

13. The method according to claim 8, wherein each of the through-holes exposes portions of the sealant.

14. The method according to claim 8, wherein each of the through-holes are rectangular shaped having long sides and short sides.

15. The method according to claim 14, wherein the long sides of the through-holes are formed perpendicular to a direction along the sealant.

16. The method according to claim 8, wherein each of the through-holes are circular shaped.

17. The method according to claim 8, wherein the through-holes form a plurality of columns.

18. A method of fabricating a liquid crystal display device, comprising:
    forming a thin film transistor within an active area of a first substrate;
    forming a color filter layer and a black matrix on a second substrate;
    forming a photo-hardening and thermo-hardening sealant along a periphery of the active area;
    bonding the first and second substrates;
    hardening the sealant by exposure to light; and
    further hardening the sealant by exposure to heat after hardening the sealant by exposure to light,
    wherein the active area is bounded by a metal pattern having at least one slit, the black matrix layer and the sealant are offset and do not overlap each other, and a width of the black matrix is greater than that of the sealant so as to form an irradiation path, wherein the black matrix is not exposed to the light used to expose the sealant.

19. The method according to claim 18, wherein the metal pattern includes metal lines spaced apart at constant intervals.

20. The method according to claim 19, wherein each of the metal lines has a width of about 50-100 μm.

21. The method according to claim 19, wherein the constant interval between adjacent metal lines is about 50-100 μm.

22. The method according to claim 18, wherein the metal pattern is one of a common electrical line, a gate line, and a data line of the liquid crystal display device.

* * * * *